United States Patent
Qi et al.

(10) Patent No.: US 11,313,963 B2
(45) Date of Patent: Apr. 26, 2022

(54) MILLIMETER WAVE HOLOGRAPHIC THREE-DIMENSIONAL IMAGING DETECTION SYSTEM AND METHOD

(71) Applicants: SHENZHEN CCT THZ TECHNOLOGY CO., LTD., Shenzhen (CN); CHINA COMMUNICATION TECHNOLOGY CO., LTD., Shenzhen (CN)

(72) Inventors: Chunchao Qi, Shenzhen (CN); Shukai Zhao, Shenzhen (CN); Chengyan Jia, Shenzhen (CN); Guangsheng Wu, Shenzhen (CN); Qing Ding, Shenzhen (CN); Juncheng Liu, Shenzhen (CN); Beibei Liu, Shenzhen (CN); Yandong Zhang, Shenzhen (CN); Yanli Liu, Shenzhen (CN)

(73) Assignees: SHENZHEN CCT THZ TECHNOLOGY CO., LTD., Shenzhen (CN); CHINA COMMUNICATION TECHNOLOGY CO., LTD., Shenzhen (CN)

(*) Notice: Subject to any disclaimer, the term of this patent is extended or adjusted under 35 U.S.C. 154(b) by 153 days.

(21) Appl. No.: 16/066,629

(22) PCT Filed: Jan. 27, 2016

(86) PCT No.: PCT/CN2016/072411
§ 371 (c)(1),
(2) Date: Jun. 27, 2018

(87) PCT Pub. No.: WO2017/113465
PCT Pub. Date: Jul. 6, 2017

(65) Prior Publication Data
US 2019/0004171 A1    Jan. 3, 2019

(30) Foreign Application Priority Data
Dec. 28, 2015    (CN) .......................... 201511006075.1

(51) Int. Cl.
*G01S 13/90*    (2006.01)
*G01V 9/00*    (2006.01)
(Continued)

(52) U.S. Cl.
CPC .......... *G01S 13/9011* (2013.01); *G01S 7/352* (2013.01); *G01S 13/89* (2013.01); *G01V 3/12* (2013.01);
(Continued)

(58) Field of Classification Search
CPC ...... G01S 13/426; G01S 13/887; G01S 13/89; G01S 13/90; G01S 13/9011;
(Continued)

(56) References Cited

U.S. PATENT DOCUMENTS 5,455,590 A * 10/1995 Collins ................. G01S 13/887
                                                      342/179
5,557,283 A *  9/1996 Sheen .................. G01S 13/887
                                                      342/179
(Continued)

FOREIGN PATENT DOCUMENTS

| CN | 102393536 | 3/2012 |
| CN | 102393537 | 3/2012 |

(Continued)

OTHER PUBLICATIONS

Skolnik et al. | "Chapter three: CW and Frequency-Modulated Radar" IN: "introduction to Radar Systems", Jan. 1, 1981, McGraw Hill, XP055047545, pp. 68-100.
(Continued)

*Primary Examiner* — Timothy A Brainard
(74) *Attorney, Agent, or Firm* — Jason P. Mueller; FisherBroyles, LLP

(57) ABSTRACT

This invention provides millimeter wave holographic 3D imaging detection system, which comprises: a transmitting antenna configured to transmit a millimeter wave transmitting signal to an object to be detected; a receiving antenna configured to receive an echo signal from the object to be detected; a millimeter wave transceiving module configured to generate the millimeter wave transmitting signal transmitted to the object to be detected and receive and process the echo signal from the receiving antenna; a scanning device configured to support the millimeter wave transceiving module, the transmitting antenna and the receiving antenna, and move the millimeter transceiving module, the transmitting antenna and the receiving antenna along a preset track, so as to scan the object to be detected with millimeter waves; a data gathering and processing module configured to gather and process the echo signal output from the millimeter wave transceiving module to generate a 3D image of the object to be detected; and an image display unit configured to display the 3D image generated by the data gathering and processing module. Besides, this invention also provides a method of millimeter wave holographic 3D imaging detection on an object to be detected using the above system thereof. The technical solution of this invention has the advantages of simple structure, high resolution, short imaging time, and larger field of view.

8 Claims, 4 Drawing Sheets (51) Int. Cl.
  *G01S 13/89* (2006.01)
  *G01V 3/12* (2006.01)
  *G01S 7/35* (2006.01)
  *G01S 13/42* (2006.01)
  *G01S 13/88* (2006.01)

(52) U.S. Cl.
  CPC .............. *G01V 9/00* (2013.01); *G01S 7/356* (2021.05); *G01S 13/426* (2013.01); *G01S 13/887* (2013.01); *G01S 13/90* (2013.01)

(58) Field of Classification Search
  CPC ..... G01S 2007/356; G01S 7/352; G01V 3/12; G01V 9/00
  See application file for complete search history.

(56) References Cited

U.S. PATENT DOCUMENTS

| | | | |
|---|---|---|---|
| 2009/0040099 A1* | 2/2009 | Young | G01S 13/867 342/179 |
| 2010/0295725 A1 | 11/2010 | Krozer | |
| 2015/0048964 A1* | 2/2015 | Chen | G01S 13/887 342/22 |
| 2015/0293221 A1 | 10/2015 | Ahmed | |

FOREIGN PATENT DOCUMENTS

| | | |
|---|---|---|
| CN | 102426361 | 4/2012 |
| CN | 102508240 | 6/2012 |
| CN | 102508306 | 6/2012 |
| CN | 104375143 A | 2/2015 |
| CN | 104375144 A | 2/2015 |
| CN | 105699494 | 6/2016 |
| EP | 2846171 A1 | 3/2015 |
| WO | 2011129342 | 10/2011 |

OTHER PUBLICATIONS

Brylert et al. | "A 600 GHz imaging radar for conceal objects detection", Radar Conference, 2009 IEEE, Piscataway, NJ, US, May 4, 2009, pp. 1-3.

Zhang et al. | "Terahertz Imaging Radar With Inverse Aperture Synthesis Techniques: System Structure, Signal Processing, and Experiment Results", IEEE Sensors Journal, IEEE Service Center, New York, NY, US; vol. 15, No. 1, Jan. 1, 2015, pp. 290-299.

\* cited by examiner

MILLIMETER WAVE HOLOGRAPHIC THREE-DIMENSIONAL IMAGING DETECTION SYSTEM AND METHOD

TECHNICAL FIELD

Aspects of the present disclosure relate to a system and a method for millimeter wave holographic 3D imaging detection, and more particularly, to a system and a method based on the linear frequency modulation, superheterodyne detection principle and holographic imaging principle.

BACKGROUND

The frequency of millimeter wave is between 30 GHz to 300 GHz (the wavelength is between 1 mm to 10 mm). In practical engineering applications, the low end frequency of millimeter wave is usually lowered to 26 GHz. In the electromagnetic spectrum, the frequency of millimeter wave is between microwave and infrared wave. Compared with microwave, the characteristics of millimeter wave are short wave length, wide bandwidth (with broad space for usage) and propagation characteristics in the air. Compared with infrared wave, millimeter wave has the capability of all-weather operations and can be applied in harsh conditions, such as smoke and mist. Under the circumstance that the frequency band of microwave is more and more crowded, millimeter wave has the merits of microwave and also has some merits that low-frequency band microwave lacks.

Specifically, millimeter wave has the following characteristics: 1. high precision, millimeter wave radar gets narrow wave beam and wide absolute bandwidth more easily, so that millimeter wave radar system has better anti-electronic interference capability; 2. among Doppler radars, millimeter wave's Doppler frequency has a high resolution; 3. in a millimeter wave imaging system, millimeter wave is sensitive to the shape and the structure of an object, can easily distinguish a metal object from background environment, and the obtained image has a high resolution, so as to enhance the capability of object identification and detection; 4. millimeter wave can penetrate plasma; 5. compared with infrared wave, millimeter wave is less influenced by harsh condition; 6. a millimeter wave system has small volume and light weight. As such, compared with a microwave circuit, the size of a millimeter wave circuit is much smaller and the millimeter wave system is easier to be integrated. It is these characteristics that bring millimeter wave technology wide application prospects, especially in the fields of nondestructive testing and security check.

In the initial stage of millimeter wave imaging, a millimeter wave imaging system uses single-channel mechanical scanning mechanism. Such imaging mechanism is simple in structure but needs a long scanning time. In order to shorten scanning time, Millivision corporation has developed a Vetal125 imager. Except a transmission scanning system, this imager also comprises an 8*8 array receive mechanism. However, such imager is more suitable for outdoor wide-range remote monitoring, and its field of view is less than 50 cm. Trex corporation has developed a PMC-2 imaging system. The antenna unit of this imaging system adopts 3 mm phased-array antenna technology. The PMC-2 imaging system adopts a millimeter wave with central frequency of 84 GHz. Since the working frequency of such imaging system is close to the terahertz frequency band, the cost is high. Lockheed Martin corporation also has developed a focal plane array imaging system, and the center frequency of the millimeter wave adopted by this system is 94 GHz. TRW corporation has developed a passive millimeter wave imaging system, and the center frequency of the millimeter wave adopted by this system is 89 GHz. The field of view of the imaging systems of Lockheed Martin and TRW corporations is small, usually less than 50 cm.

In the field of nowadays millimeter wave imaging, the research results of millimeter wave imaging mainly come from Pacific Northwest National Laboratory. McMakin et al. in this laboratory have developed a 3D holographic imaging scanning system. The scanning mechanism of this imaging system is based on cylindrical scanning. Furthermore, this system has realized commercialization of millimeter wave imaging system. This imaging system adopts an active imaging mechanism, and the 3D millimeter wave image of an object is obtained by holographic algorithm inversion. This technology has been authorized to L-3 Communications and Save View corporations. Their products have been respectively used in security check of stations and wharves and in trying clothes. However, because this system adopts 384 transceiving units, the cost cannot be lowered down. At present, Pacific Northwest National Laboratory is developing a millimeter wave imaging system of higher frequency.

Except the above laboratory and corporations, many institutes and entities in UK, US et al., participate in the research of millimeter wave imaging technology, for example, corporations such as Army, Navy, and Luftwaffe research laboratory and navy coast base and colleges such as Delaware and Arizona in US, and Reading college, Durham college and Farran corporation in UK.

Except UK and US, German Microwave and Radar Institute and German Aerospace Center also participate in the research of millimeter imaging technology. ICT center in Australia and NEC corporation in Japan have reported some millimeter wave imaging research results. However, these millimeter wave research results are either in the laboratory stage or the developed products are high in price or with small detection field of view.

As such, it is necessary to provide a millimeter wave 3D imaging detection system with low price and large field of view.

SUMMARY

The objective of this invention is to provide a millimeter wave holographic 3D imaging detection system with simple structure, high resolution and short imaging time.

According to an aspect of this invention, a millimeter wave holographic 3D imaging detection system is provided. This system comprises: a transmitting antenna configured to transmit a millimeter wave transmitting signal to an object to be detected; a receiving antenna configured to receive an echo signal from the object to be detected; a millimeter wave transceiving module configured to generate the millimeter wave transmitting signal transmitted to the object to be detected and receive and process the echo signal from the receiving antenna; a scanning device configured to support the millimeter wave transceiving module, the transmitting antenna and the receiving antenna, and move the millimeter transceiving module, the transmitting antenna and the receiving antenna along a preset track, so as to scan the object to be detected with millimeter waves; a data gathering and processing module configured to gather and process the echo signal output from the millimeter wave transceiving module to generate a 3D image of the object to be detected; and an image display unit configured to display the 3D image generated by the data gathering and processing module.

Further, in the above millimeter wave holographic 3D imaging detection system, a millimeter wave transceiving unit comprises one millimeter wave transceiving module, one transmitting antenna, and one receiving antenna; the direction of the transmitting antenna in the millimeter wave transceiving unit is the same as that of the receiving antenna; N millimeter wave transceiving units are arranged along the same direction to form a row of millimeter wave transceiving systems, wherein N is an integer greater than or equal to 2.

Further, the scanning device comprises: two flat surface detection panels, wherein each is used to support the row of millimeter wave transceiving system, and the two rows of millimeter wave transceiving systems in the two flat surface detection panels have opposite directions; two pairs of guideways, which are respectively placed on two sides of each flat surface detection panel, and each pair of guideways cooperate with each other to limit the row of millimeter wave transceiving system supported by corresponding flat surface detection panel to move along a preset track; and a motor, which is used to drive the row of millimeter wave transceiving system to move along the track of the corresponding guideway.

Further, N millimeter wave transceiving modules, N transmitting antennas, and N receiving antennas are arranged on each flat surface detection plane. Each millimeter wave transceiving module corresponds to one transmitting antenna and one receiving antenna. N millimeter wave transceiving modules are arranged in parallel to form a row of millimeter wave transceiving systems, N transmitting antennas are arranged in parallel to form an array of transmitting antennas, and N receiving antennas are arranged in parallel to form an array of receiving antennas, wherein N is an integer greater than or equal to 2.

Further, the row of millimeter wave transceiving system is controlled according to time sequence, so that the N millimeter wave transceiving units transmit and receive one by one according to preset sequence.

Further, the millimeter wave transceiving module comprises:
  a transmitting link configured to generate a millimeter wave transmitting signal to the object to be detected according to a first signal source; and
  a receiving link configured to coordinate with the first signal source to generate a signal coherent with the received echo signal according to a second signal source, and send the echo signal to the data gathering and processing module after processing;
  wherein the first signal source is a frequency modulation signal source working at a first frequency range, and the second signal source is a dot frequency signal source working at a first frequency.

Further, the transmitting link comprises: a first directional coupler, wherein the input port of the first directional coupler is connected to the first signal source, and the pass-through port of the first directional coupler is connected to a first power amplifier; the first power amplifier configured to amplify the power of the signal output by the first directional coupler to reach a safer input power range of a first frequency doubler; and the first frequency doubler configured to double the frequency of the signal output by the first power amplifier to a second frequency range and output the frequency-doubled signal to the transmitting antenna.

Further, the receiving link comprises: a second directional coupler, wherein the input port of the second directional coupler is connected to the second signal source; a first mixer, wherein the local oscillation port of the first mixer is connected to the pass-through port of the second directional coupler, and the radio-frequency port of the first mixer is connected to the coupling port of the first directional coupler to generate a difference frequency signal of the first signal source and the second signal source; a second power amplifier, wherein the input port of the second power amplifier is connected to the intermediate frequency port of the first mixer to receive the difference frequency signal, and the second power amplifier amplifies the power of the difference frequency signal to reach the safe input power range of a second frequency doubler; the second frequency doubler, wherein the input port of the second frequency doubler is connected to output of the second power amplifier to double the frequency of the signal output by the second power amplifier to a second frequency; a second mixer, wherein the local oscillation port of the second mixer is connected to the output port of the second frequency doubler, and the radio-frequency port of the second mixer is configured to receive the echo signal received by the receiving antenna to generate a first down-converted signal; a third power amplifier, wherein the input port of the third power amplifier is connected to the coupling port of the second directional coupler to amplify the power of the signal from the second directional coupler; a third frequency doubler, wherein the input port of the third frequency doubler is connected to output port of the third power amplifier to double the frequency of the signal from the third power amplifier to the second frequency; a third mixer, wherein the local oscillation port of the third mixer is connected to the output port of the third frequency doubler, and the radio-frequency port of the third mixer is connected to the intermediate frequency port of the second mixer to generate a second down-converted signal.

Further, the receiving link also comprises a low noise amplifier, wherein the input port of the low noise amplifier is connected to the intermediate frequency port of the third mixer to amplify the received second down-converted signal and output it to the data gathering and processing module.

Further, the first frequency range is 13.5 GHz-16.5 GHz, the second frequency range is 27 GHz-33 GHz, the first frequency is 35 MHz, and the second frequency is 70 MHz.

According to another aspect of this invention, a method of millimeter wave holographic 3D imaging detection on an object to be detected using the above system thereof is provided.

A method of millimeter wave holographic 3D imaging detection on an object to be detected using the system thereof. The method comprises the following steps: the scanning device moves the millimeter wave transceiving module, the transmitting antenna, and the receiving antenna to scan the object to be detected; the millimeter wave transceiving module generates a millimeter wave transmitting signal; the transmitting antenna transmits the millimeter wave transmitting signal generated by the millimeter wave transceiving module to the object to be detected; the receiving antenna receives an echo signal from the object to be detected and transmits the echo signal to the millimeter wave transceiving module; the millimeter wave transceiving module processes the echo signal and sends it to the data gathering and processing module; the data gathering and processing module processes the signal from the millimeter wave transceiving module to generate a 3D image of the object to be detected; and the image display unit displays the 3D image generated by the data gathering and processing module.

Further, the data gathering and processing module performs the following steps: gathering the echo signal from the millimeter wave transceiving module, associating the echo signal to a spatial location signal, and performing Fourier transform and inverse Fourier transform to obtain the 3D image.

Compared with existing millimeter wave 3D imaging detection systems, the technical solution of this invention simplifies the system structure, improves the resolution, shortens the imaging time, and has larger field of view.

DETAILED DESCRIPTION

In order to make the objectives, technical solutions and advantages of the invention more clearer, the invention is further described in conjunction with appended drawings and embodiments. It should be understood that the specific embodiments described herein are used only to explain the present invention and are not intended to limit the invention.

A millimeter wave imaging mechanism mainly comprises millimeter wave active imaging and millimeter wave passive imaging. The advantages of the passive millimeter wave imaging system are simple structure and low implementation cost, and the disadvantages are long imaging time and inferior imaging resolution. With the improvement of millimeter wave device level and the development of millimeter wave device technology, millimeter wave active imaging is getting more and more attention. In millimeter wave active imaging, active synthetic aperture imaging and active holographic imaging are main imaging mechanisms. The method of millimeter wave holographic imaging comes from the method of optical hologram. Millimeter wave holographic imaging mainly adopts electromagnetic wave coherence principle. A transmitter first transmits a millimeter wave signal with high stability. A receiver receives the transmitting signal from each point of an object and performs coherent processing an echo signal with a reference signal with high coherence to extract the amplitude and phase information of the echo signal, so as to obtain the emission characteristic of each point of the object. Finally, the object millimeter wave image in an environment can be obtained by data and image processing method. The millimeter wave image obtained by millimeter wave active holographic imaging has a good resolution. The millimeter wave active holographic imaging can greatly shorten imaging time when cooperating with mechanical scanning and realize engineering. Therefore, the millimeter holographic imaging is especially suitable for millimeter wave short range active imaging.

The embodiments of this invention are described in detail according to the accompany drawings.

Figure 1:
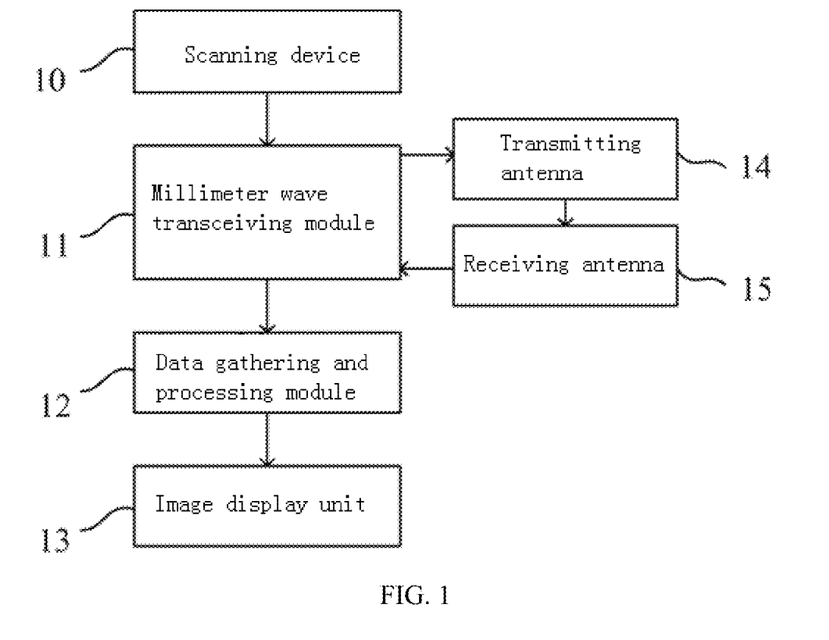
FIG. 1 illustrates a block diagram of a millimeter wave holographic 3D imaging detection system according to this invention.
Figure 2:
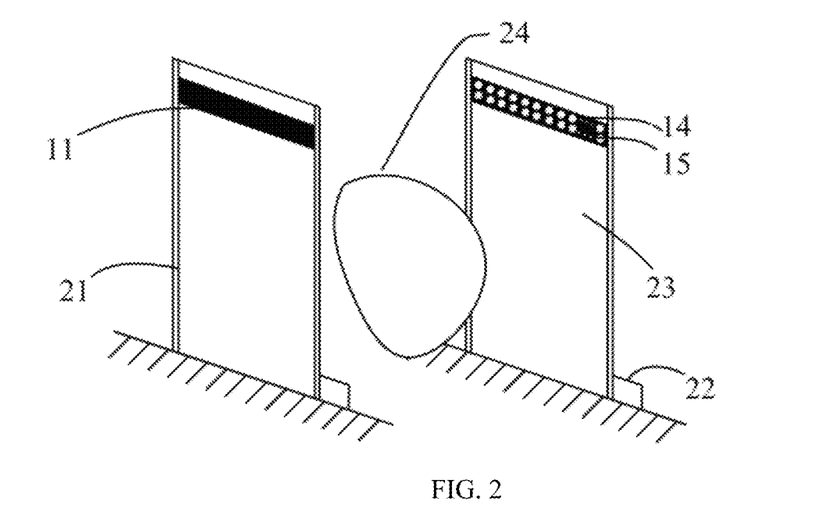
FIG. 2 illustrates a structural diagram of the millimeter wave holographic 3D imaging detection system according to this invention.

FIG. 1 illustrates a block diagram of a millimeter wave holographic 3D imaging detection system according to this invention. FIG. 2 illustrates a structural diagram of the millimeter wave holographic 3D imaging detection system according to this invention.

As illustrated in FIG. 1, a millimeter wave holographic 3D imaging detection system of this invention comprises: a transmitting antenna 14 configured to transmit a signal to an object to be detected; a receiving antenna 15 configured to receive an echo signal from the object to be detect; a millimeter wave transceiving module 11 configured to generate a millimeter wave transmitting signal sending to an object to be detected, receive and process the echo signal from the receiving antenna 15; a scanning device 10 configured to support the millimeter wave transceiving module 11, the transmitting antenna 14 and the receiving antenna 15 and move the millimeter wave transceiving module 11, the transmitting antenna 14 and the receiving antenna 15 along a preset track, so as to scan the object to be detected by millimeter wave; a data gathering and processing module 12 configured to gather and process the echo signal output by the millimeter wave transceiving module 11 to generate a 3D image of the object to be detected; and a imaging display unit 13 configured to display the 3D image generated by the data gathering and processing module.

As illustrated in FIG. 2, the scanning device 10 comprises a vertical guideway 21, a motor (for example, a stepper motor) 22, a flat surface detection plane 23. Specifically, the scanning device 10 comprises two flat surface detection planes 23 for supporting the millimeter wave transceiving module 11, the transmitting antenna 14 and the receiving antenna 15. The object to be detected 24 is placed between the two flat surface detection planes 23. Each pair of guideways cooperate with each other to limit the millimeter wave transceiving module 11, the transmitting antenna 14 and the receiving antenna 15 supported by corresponding flat surface detection plane to move up and down along the guideways 21. The scanning device 10 also comprises a control motor 22 beside the detection plane 23. The control motor 22 is used to control the millimeter wave transceiving module 11, the transmitting antenna 14 and the receiving antenna 15 to move up and down along the guideways 21, so as to scan the object to be detected 24 up and down. Preferably, as illustrated in FIG. 2, the two flat surface detection planes 23 are arranged in parallel.

As illustrated further in FIG. 2, N millimeter wave transceiving modules 11, N transmitting antennas 14, and N receiving antennas 15 are arranged on each flat surface detection plane 23. Each millimeter wave transceiving module 11 corresponds to one transmitting antenna 14 and one receiving antenna 15. N millimeter wave transceiving modules are arranged in parallel to form a row of millimeter wave transceiving systems, N transmitting antennas 14 are arranged in parallel to form an array of transmitting antennas, and N receiving antennas 15 are arranged in parallel to form an array of receiving antennas, wherein N is an integer greater than or equal to 2. In other words, one millimeter wave transceiving module 11, one transmitting antenna 14, and one receiving antenna 15 constitute a millimeter wave transceiving unit. As illustrated in FIG. 2, a transmitting antenna and a receiving antenna in a millimeter wave transceiving unit have the same direction and are placed in the same column of an antenna array. The N millimeter wave transceiving units are arranged in the same direction (e.g., in horizontal direction) to form a row of millimeter wave transceiving systems, wherein N is an integer greater than or equal to 2. Still referring to FIG. 2, the directions of a row of millimeter wave transceiving systems supported by the two flat surface detection panels 23 are opposite to each other. That is, the antenna array directions of a row of millimeter wave transceiving systems supported by the two flat surface detection panels 23 are opposite to each other. As a result, the location information of the two opposite surfaces of the object to be detected can be scanned by moving up and down the two rows of millimeter wave transceiving systems corresponding to the two flat surface detection panels 23, so as to provide data to the data gathering and processing module 12 for subsequent compositing a complete 3D image of the object to be detected.

In addition, a row of millimeter wave transceiving systems are controlled according to time sequence, so that the N millimeter wave transceiving units transmit and receive millimeter waves one by one according to preset order. That is, the N millimeter wave transceiving modules 11 are controlled by time sequence to transmit and receive millimeter waves one by one, so as to accomplish horizontal scanning to the object to be detected. For example, the N millimeter wave transceiving modules 11 can be controlled by a single-pole multiple throw switch. Of course, any time sequence control device known in the art can be applied.

In addition, the object to be detected can move to improve imaging speed.

It should be noted that, the number of the millimeter wave transceiving modules 11 and the corresponding transmitting antennas 14 and receiving antennas 15 in a row of millimeter wave transceiving systems can be set according to parameters such as the width of the flat surface detection panel 23 and the desired imaging speed, while the width of the flat surface detection panel 23 can be determined according to the size of the object to be detected 24. In addition, the distance between the flat surface detection panel 23 and the object to be detected 24 can be determined according to antenna parameter and other parameters. The size settings mentioned above are obvious for persons skilled in the art, and thus not describe in detail.

For example, a row of millimeter wave transceiving systems may comprise 64 millimeter wave transceiving modules 11 and 128 antennas, wherein 1-64 transmitting antennas constitute the transmitting antenna array 14 for radiating linear frequency modulation continuous waves generated by the 64 millimeter wave transceiving modules 11 to the object to be detected 24, and 65-128 receiving antennas constitute the receiving antenna array 15 for receiving signals reflected by the object to be detected and transmitting them to the 64 millimeter wave transceiving modules 11. Each transmitting antenna corresponds to one receiving antenna, and transmitting antenna 1, 2, 3, ..., 63, and 64 corresponds to receiving antenna 65, 66, 67, ..., 127, and 128 respectively. As stated above, the 64 millimeter wave transceiving modules 11 do not work at the same time, but are controlled by for example two-layer single-pole multiple throw switches to transmit and receive one by one.

Figure 3:
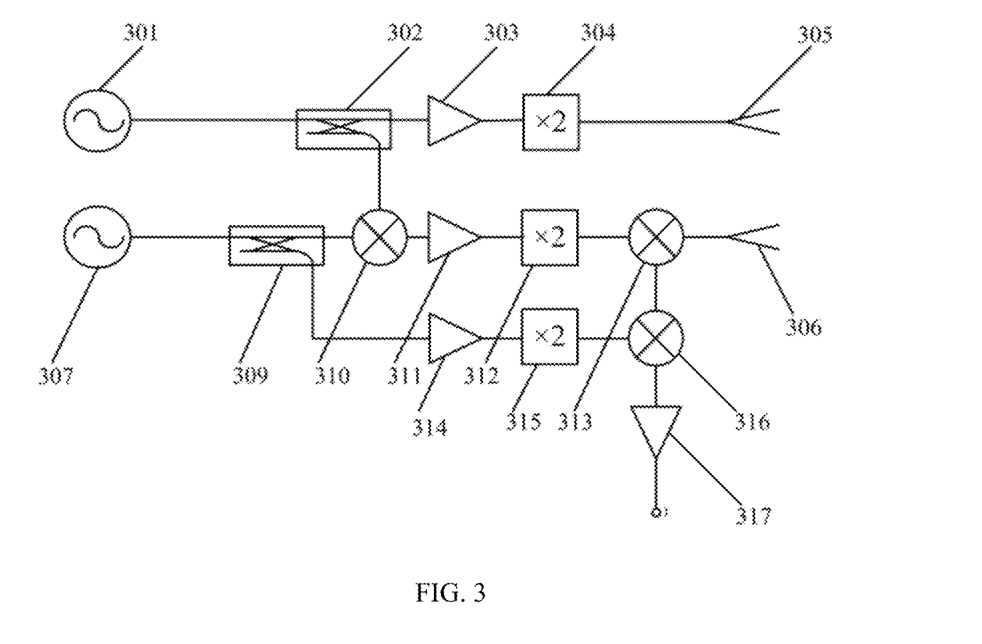
FIG. 3 illustrates an electrical connection diagram of a millimeter wave transceiving module, a transmitting antenna, and a receiving antenna of the millimeter wave holographic 3D imaging detection system according to this invention.

FIG. 3 illustrates an electrical connection diagram of the millimeter wave transceiving module 11, the transmitting antenna 305, and the receiving antenna 306 in the millimeter wave holographic 3D imaging detection system according to this invention, wherein the millimeter wave transceiving module 11 comprises:

a transmitting link, which is configured to generate a millimeter wave transmitting signal to the object to be detected according to a first signal source 301; and a receiving link, which is configured to coordinate with the first signal source 301 to generate a signal coherent to the received echo signal according to a second signal source 307, and send the signal to the data gathering and processing module after processing the echo signal;

wherein the first signal source 301 is a frequency modulation signal source working at a first frequency range, and the second signal source 307 is a dot frequency signal source working at a first frequency.

As illustrated in FIG. 3, the millimeter wave transceiving module 11 comprises:

the transmitting link, which comprises the signal source 301, a directional coupler 302, a power amplifier 303, a frequency doubler 304, for generating a millimeter wave transmitting signal to the object to be detected 24; and the receiving link, which comprises the signal source 307, a directional coupler 309, mixers 310, 313, and 316, power amplifiers 311 and 314, frequency doublers 312 and 315, and a low noise amplifier 317, for receiving an echo signal from the object to be detected 24, processing the echo signal, and sending it to the data gathering and processing module 12.

Specifically, the signal source 301 is a frequency modulation signal source working in a certain frequency range (e.g., 13.5 GHz-16.5 GHz) and can be expressed as:

$$S_1(t) = A_1 \cos\left[2\pi\left(f_1 t + \frac{B}{2T}t^2\right) + \varphi_1\right] \quad (1)$$

wherein $A_1$ is an initial amplitude, $f_1$ is an initial scanning frequency of 13.5 GHz, t represents time, $\varphi_1$ is an initial phase of the signal source 301, B is the bandwidth of a frequency modulation signal, and T is the frequency modulation duration.

In addition, the signal source 307 is a single frequency continuous wave signal source working in a fixed frequency (e.g., 35 MHz) and can be expressed as:

$$S_2 = A_2 \cos(2\pi f_2 t + \varphi_2) \quad (2)$$

wherein $A_2$ and $\varphi_2$ represent the initial amplitude and phase respectively, and $f_2$ is the frequency.

It should be noted that, the frequency range of the signal source 301 and the frequency of the signal source 307 can be selected according to resolution requirement, which is common sense for persons skilled in the art and hence not described here.

The directional coupler 302 is a three-port device, wherein the input port receives the output signal of the signal source 301, the pass-through port is connected to the power amplifier 303, so that the power of the transmitting link reaches safe input power range of the frequency doubler 304. After the frequency doubler 304, the frequency of the transmitting link is doubled to a second frequency range (this frequency range is 27 GHz-33 GHz when the frequency range of the signal source 301 is 13.5 GHz-16.5 GHz), and finally radiated by a transmitting antenna to the object to be detected. Here, the transmitting signal can be expressed as:

$$S_1'(t) = A_1' \cos\left[2\pi\left(f_1 t + \frac{B}{2T}t^2\right) + 2\varphi_1\right] \quad (3)$$

wherein $A_1'$ is the amplitude of the transmitting signal.

The output signal of the second signal source 307 is connected to the input port of the directional coupler 309. The mixer 310 is a three-port device, wherein the local oscillation LO port is connected to the pass-through port of the directional coupler 309 to input an intermediate-frequency (e.g., 35 MHz) signal, the radio frequency RF port is connected to the coupling port of the directional coupler 302 to input a frequency modulation (e.g., 13.5 GHz-16.5 GHz) signal, and the intermediate-frequency IF port outputs the difference frequency signal of the signals input by LO port and RF port to the power amplifier 311. The power amplifier 311 amplifies the power of the signal to the safe working range of the frequency doubler 312. At this time, the output signal of the frequency doubler 312 is a signal mixed by the two signal sources and then frequency-doubled, which can be expressed as:

$$S(t) = \frac{A_1' A_2'}{2} \cos\left\{2\pi\left[2(f_1 t - f_2 t) + \frac{B}{T}t^2\right] + 2(\varphi_1 - \varphi_2)\right\} \quad (4)$$

The mixer 313 is a three-port device, wherein local oscillation LO port is connected to the output signal $S(t)$ of the frequency doubler 312, the radio frequency RF port obtains the echo signal received by the receiving antenna 15 and reflected by the object to be detected. The echo signal can be expressed as:

$$S_1''(t) = \alpha A_1' \cos\left\{2\pi\left[2f_1(t-\tau) + \frac{B}{T}(t-\tau)^2\right] + 2\varphi_1\right\} \quad (5)$$

wherein $\alpha$ is the attenuation coefficient of the echo signal, $\tau = 2R/c$ is the return delay generated by the object to be detected, and c is electromagnetic wave's propagation speed in space.

The intermediate frequency IF port of the mixer 313 outputs the superheterodyne signal of the signals received by local oscillation LO port and radio frequency RF port, wherein the signal has some space object information, which can be expressed as:

$$S_{IF}(t) = \alpha \frac{A_1' A_2'}{2} \cos\left\{2\pi\left[2f_1(t-\tau) - 2f_2 + \frac{B}{T}(t-\tau)^2\right] + 2\varphi_1 - 2\varphi_2\right\} \quad (6)$$

According to expression (6), the two signal sources are noncoherent. In order to obtain coherent signals, a mixer 316 is introduced. The mixer 316 outputs a coherent superheterodyne signal with object information, and its radio reference port inputs a first down-converted signal $S_{IF}(t)$ from the mixer 313, and the local oscillation port inputs a continuous wave signal (e.g., 70 MHz) output by the signal source 307 through the coupling port of the directional coupler 309, the power amplifier 314 and the frequency doubler 315, i.e., $$S_2' = A_2' \cos(4\pi f_2 + 2\varphi_2) \quad (7)$$

wherein $A_2'$ represents the amplitude of a signal.

The intermediate frequency IF port of the mixer 316 outputs a second down-converted signal $S_{IF}'(t)$ with object information, i.e., $$S_{IF}'(t) = \alpha \frac{A_1' A_2'}{8} \cos\left[2\pi\left(2\frac{B}{T}\tau t - \frac{B}{T}\tau^2 + 2f_1\tau\right)\right] \quad (8)$$

From expression (8), this method eliminates the phase unsynchronization caused by the two nonconherent signal sources.

Further, the low noise amplifier 317 can amplify the weak intermediate frequency signal being down-converted twice to improve the output signal's signal-to-noise ratio and detection sensitivity. Its output signal is sent to the data gathering and processing module 12.

The data gathering and processing module 12 processes the signal from the millimeter wave transceiving module 11 to generate a 3D image of the object to be detected, which comprises:

gathering the echo signal from the millimeter wave transceiving module, associating the echo signal with the spatial location signal, and obtaining the 3D image by Fourier transform and inverse Fourier transform.

Figure 4:
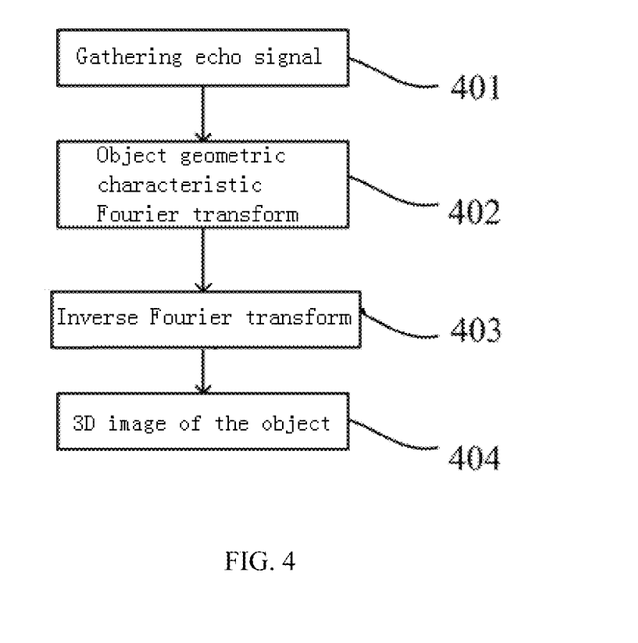
FIG. 4 illustrates a flow diagram of a holographic 3D imaging algorithm performed by the data gathering and processing module of the millimeter wave holographic 3D imaging detection system according to this invention.

FIG. 4 illustrates a flow diagram of a holographic 3D imaging algorithm performed by the data gathering and processing module of the millimeter wave holographic 3D imaging detection system according to this invention.

As illustrated in FIG. 4, the data gathering and processing module 12 first gathers the echo signal from the gathered signal (401), and then the echo signal is associating with the spatial location signal. A geometric characteristic Fourier transform is performed (402), then an inverse Fourier transform is performed after simplification and transformation (403), and finally the object's 3D image is obtained (404). The final data is obtained by taking the spatial domain location information into consideration.

Figure 5:
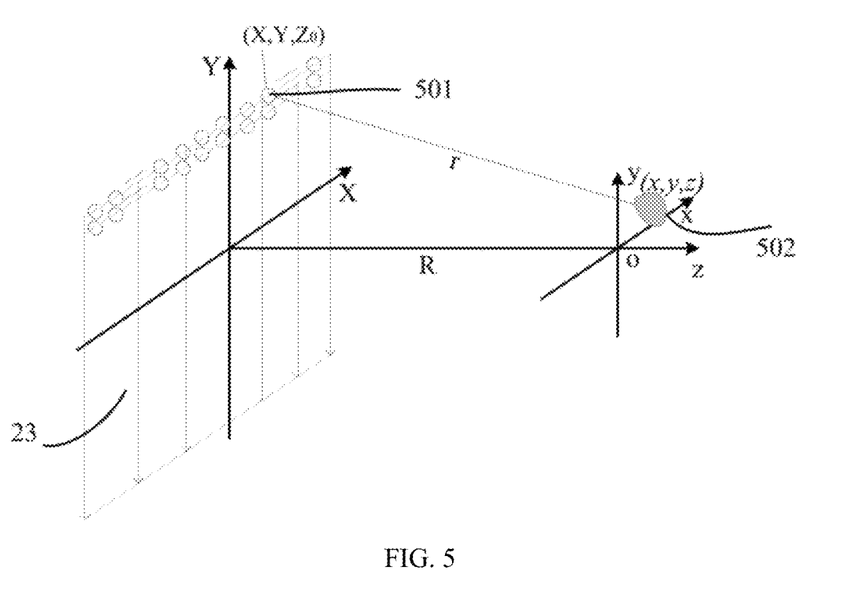
FIG. 5 illustrates a 3D object imaging schematic diagram of the millimeter wave holographic 3D imaging detection system according to this invention.

FIG. 5 illustrates a 3D object imaging schematic diagram of the millimeter wave holographic 3D imaging detection system according to this invention.

As illustrated in FIG. 5, after a millimeter wave is scattered by an object 502 of the position (x, y, z), a receiving antenna 501 of the position (X, Y, $Z_0$) receives the scattered broadband echo signal. The signal received by the antenna is sent to the millimeter wave circuit to be down-converted by the local oscillation signal with high coherence, and then is amplified by the low noise amplifier 317. The obtained signal is expressed as $E(X, Y, \omega)$, wherein $\omega$ is the instantaneous angular frequency of the emission source. $E(X, Y, \omega)$ is the function of $\omega$, which can be expressed as follow:

$$E(X, Y, \omega) = \iiint \frac{1}{\gamma} f(x, y, z) e^{(-j\vec{K} \boxtimes \vec{r})} dx\,dy\,dz \quad (9)$$

wherein $\vec{\gamma}$ is the distance between the antenna and the object, $\vec{K}$ is the electromagnetic wave beam, the exponent part expresses a spherical signal scattered by the object and is important for object 3D scattering imaging. Furthermore, $$\vec{K} \boxtimes \vec{r} = (x-X)\vec{K}_x + (y-Y)\vec{K}_y + (z-Z)\vec{K}_z \quad (10)$$

$E(X, Y, \omega)$ is a frequency domain signal and is an expression after Fourier transforming the time domain signal $E(X, Y, t)$, i.e., $$E(X,Y,\omega)=FT[E(X,Y,t)] \quad (11)$$

Expression (10) is substituted into expression (9), simplifying the vector calculation of expression (9) to scalar calculation. To explain physically, it can be seen as expanding a spherical wave to be superposition of plane waves. Then the following expression can be obtained:

$$E(X,Y,\omega)=\iiint f^F(K_x,K_y,K_z)e^{(-jZ_0K_z)}e^{[j(xK_x+YK_y)]}dK_xdK_y \quad (12)$$

A three-dimensional Fourier transform is applied to expression (12), i.e., $$f^F(K_x,K_y,K_z)=FT_3[f(x,y,z)]=\iiint f(x,y,z)e^{[-j(xK_x+yK_y+zK_z)]}dxdydz \quad (13)$$

which also is an inverse Fourier transform, i.e., $$E(X,Y,\omega)=IFT_2[f^F(K_x,K_y,K_z)e^{(-jZ_0K_z)}] \quad (14)$$

The constant term is omitted in expression (13). The following expression is obtained by substituting expression (13) into expression (12):

$$E(X,Y,\omega)=IFT_2\{FT_3[f(x,y,z)]e^{(-jZ_0K_z)}\} \quad (15)$$

The final broadband millimeter wave holographic expression can be obtained by inverse Fourier transforming expression (15):

$$f(x,y,z)=IFT_3\{FT_2[E(X,Y,\omega)]e^{(jZ_0K_z)}\} \quad (16)$$

According to expression (16), as long as the electromagnetic information of each frequency point's echo signal is obtained, f(x, y, z) is obtained by a series of inversions, and finally the object's 3D millimeter wave holographic image is obtained.

Figure 6:
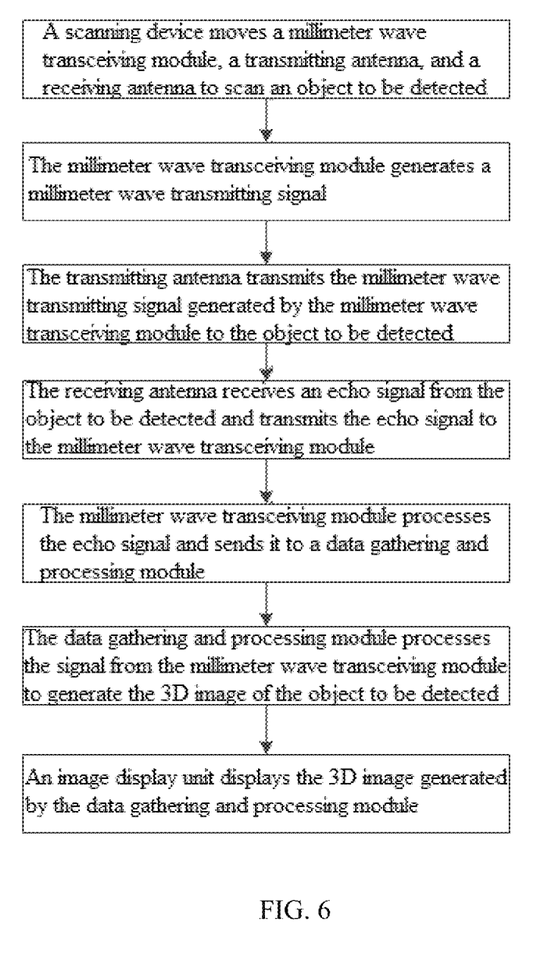
FIG. 6 illustrates a flow diagram of a millimeter wave holographic 3D imaging detection method according to this invention.

FIG. 6 illustrates a flow diagram of a millimeter wave holographic 3D imaging detection method according to this invention.

As illustrated in FIG. 6, the method of millimeter wave holographic 3D imaging detection on an object to be detected using the above system thereof comprises the following steps: a scanning device moves the millimeter wave transceiving module, the transmitting antenna, and the receiving antenna to scan the object to be detected; the millimeter wave transceiving module generates a millimeter wave transmitting signal; the transmitting antenna transmits the millimeter wave transmitting signal generated by the millimeter wave transceiving module to the object to be detected; the receiving antenna receives an echo signal from the object to be detected and transmits the echo signal to the millimeter wave transceiving module; the millimeter wave transceiving module processes the echo signal and sends it to the data gathering and processing module; the data gathering and processing module processes the signal from the millimeter wave transceiving module to generates the 3D image of the object to be detected; and the image display unit displays the 3D image generated by the data gathering and processing module.

Compared with existing imaging devices, the millimeter wave holographic 3D imaging detection system and method according to this invention have the following advantages:
(1) low price: a drive motor used in this invention can realize the area array scanning effect through one-dimensional array antenna, which reduces the cost significantly.
(2) simple structure and easy integration: this invention adopts, for example, a single pole multiple throw switch to control the sequence of the millimeter wave transceiving module channels, and uses a frequency modulation signal source and a millimeter wave devices to build system, which reduces the system's complexity greatly and improves the system's integration level.
(3) high resolution: frequency modulation continuous technology, superheterodyne technology and holographic imaging technology are used in this invention to improve the planar and depth resolution of a 3D image.
(4) fast imaging: in this invention, while a motor drives the transmitting and receiving antennas to move up and down, the object to be detected moves forward at a certain speed, which increase the imaging speed.
(5) increasing field of view: compared with the existing field of view of 50 centimeters, the embodiments according to this invention can reach a field of view of several or even tens of meters.
(6) high signal to noise ratio: this system adopts an active millimeter wave imaging, increasing antennas' transmitting power by controlling the output power range of each millimeter device; of course, the transmitting power is within the safe radiation range, so that the signal to noise ratio of the echo signal is much higher than that of the signal received by a passive millimeter wave imaging system, and hence a higher imaging quality is obtained.
(7) extensive use: the millimeter wave imaging technology's advantages of high resolution and simple structure can be used to detect all kinds of large-scale instruments' outer damage and also can be used to detect prohibited goods.

It should be noted that, the above embodiments described according to accompany drawings are merely used to illustrate this invention, and can not be construed as a limit to the scope of this invention. Persons skilled in the art should understand that any modification or alternative to this invention without departing from the spirit of this invention should be covered by the scope of this invention. In addition, unless the context clearly requires otherwise, any term in the singular applies to the plural and vice-versa. Besides, unless otherwise stated, the whole or a part of any embodiment can be used in combination with the whole or a part of any other embodiment.

The invention claimed is:
1. A millimeter wave holographic 3D imaging detection system, comprising:
a transmitting antenna configured to transmit a millimeter wave transmitting signal to an object to be detected;
a receiving antenna configured to receive an echo signal from the object to be detected;
at least one millimeter wave transceiving device configured to generate the millimeter wave transmitting signal transmitted to the object to be detected and configured to receive and process the echo signal from the receiving antenna;
a scanning device configured to support the at least one millimeter wave transceiving device, the transmitting antenna and the receiving antenna, and to move the at least one millimeter wave transceiving device, the transmitting antenna and the receiving antenna along a preset track, to scan the object to be detected with millimeter waves;
a data gathering and processing device configured to gather and process the echo signal output from the at least one millimeter wave transceiving device to generate a 3D image of the object to be detected; and
an image display device configured to display the 3D image generated by the data gathering and processing device;
wherein the at least one millimeter wave transceiving device comprises:
a transmitting link configured to generate a millimeter wave transmitting signal to the object to be detected according to a first signal source; and a receiving link configured to coordinate with the first signal source to generate a signal coherent with the received echo signal according to a second signal source, and to send the echo signal to the data gathering and processing device after processing;

wherein the first signal source is a frequency modulation signal source working at a first frequency range, and the second signal source is a single frequency continuous wave signal source working in a fixed frequency;

wherein the transmitting link comprises:

a first directional coupler, wherein an input port of the first directional coupler is connected to the first signal source, and a pass-through port of the first directional coupler is connected to a first power amplifier, wherein the first power amplifier is configured to amplify the power of the signal output by the first directional coupler to reach an input power range of a first frequency doubler, and wherein the first frequency doubler is configured to double the frequency of the signal output by the first power amplifier to a second frequency range and output a resulting frequency-doubled signal to the transmitting antenna;

wherein the receiving link comprises:

a second directional coupler, wherein an input port of the second directional coupler is connected to the second signal source;

a first mixer, wherein a local oscillation port of the first mixer is connected to a pass-through port of the second directional coupler, and a radio-frequency port of the first mixer is connected to a coupling port of the first directional coupler to generate a difference frequency signal of the first signal source and the second signal source;

a second power amplifier, wherein an input port of the second power amplifier is connected to an intermediate frequency port of the first mixer to receive the difference frequency signal, and the second power amplifier amplifies the power of the difference frequency signal to reach an input power range of a second frequency doubler;

wherein an input port of the second frequency doubler is connected to an output port of the second power amplifier to double the frequency of the signal output by the second power amplifier to a first frequency;

a second mixer, wherein a local oscillation port of the second mixer is connected to an output port of the second frequency doubler, and a radio-frequency port of the second mixer is configured to receive the echo signal received by the receiving antenna to generate a first down-converted signal;

a third power amplifier, wherein input port of the third power amplifier is connected to a coupling port of the second directional coupler to amplify the power of the signal from the second directional coupler;

a third frequency doubler, wherein an input port of the third frequency doubler is connected to an output port of the third power amplifier to double the frequency of the signal from the third power amplifier to a second frequency;

a third mixer, wherein a local oscillation port of the third mixer is connected to an output port of the third frequency doubler, and a radio-frequency port of the third mixer is connected to an intermediate frequency port of the second mixer to generate a second down-converted signal.

2. The millimeter wave holographic 3D imaging detection system of claim 1, wherein the at least one millimeter wave transceiving device comprises:
the transmitting antenna; and
the receiving antenna;
wherein the direction of the transmitting antenna in the at least one millimeter wave transceiving device is the same as that of the receiving antenna,
wherein at least two millimeter wave transceiving devices are arranged along the same direction to form a row of millimeter wave transceiving systems.

3. The millimeter wave holographic 3D imaging detection system of claim 2, wherein the scanning device comprises:
two flat surface detection panels,
wherein each flat surface detection panel is used to support the row of millimeter wave transceiving systems, and
wherein the two rows of millimeter wave transceiving systems in the two flat surface detection panels have opposite directions;
two pairs of guideways, which are respectively placed on two sides of each flat surface detection panel, and
wherein each pair of guideways cooperates with each other to limit the row of millimeter wave transceiving systems supported by corresponding flat surface detection panels to move along a preset track; and
a motor, which is used to drive the row of millimeter wave transceiving systems to move along the track of the corresponding guideway.

4. The millimeter wave holographic 3D imaging detection system of claim 2, wherein the row of millimeter wave transceiving systems is controlled according to a time sequence, so that the at least two millimeter wave transceiving devices transmit and receive one by one according to preset sequence.

5. The millimeter wave holographic 3D imaging detection system of claim 1, wherein the receiving link further comprises:
a low noise amplifier, wherein an input port of the low noise amplifier is connected to an intermediate frequency port of the third mixer to amplify the received second down-converted signal and output it to the data gathering and processing device.

6. The millimeter wave holographic 3D imaging detection system of claim 1, wherein the first frequency range is from about 13.5 GHz to about 16.5 GHz, the second frequency range is from about 27 GHz to about 33 GHz, the first frequency is 35 MHz, and the second frequency is 70 MHz.

7. A method of millimeter wave holographic 3D imaging detection using millimeter wave holographic 3D imaging detection system having a transmitting antenna configured to transmit a millimeter wave transmitting signal to an object to be detected; a receiving antenna configured to receive an echo signal from the object to be detected; a millimeter wave transceiving device configured to generate the millimeter wave transmitting signal transmitted to the object to be detected and configured to receive and process the echo signal from the receiving antenna; a scanning device configured to support the millimeter wave transceiving device, the transmitting antenna and the receiving antenna, and to move the millimeter transceiving device, the transmitting antenna and the receiving antenna along a preset track, to scan the object to be detected with millimeter waves; a data gathering and processing device configured to gather and process the echo signal output from the millimeter wave transceiving device to generate a 3D image of the object to be detected; and an image display device configured to display the 3D image generated by the data gathering and processing device; wherein the millimeter wave transceiving device includes: a transmitting link configured to generate a millimeter wave transmitting signal to the object to be detected according to a first signal source; and a receiving link configured to coordinate with the first signal source to generate a signal coherent with the received echo signal according to a second signal source, and to send the echo signal to the data gathering and processing device after processing; wherein the first signal source is a frequency modulation signal source working at a first frequency range, and the second signal source is a single frequency continuous wave signal source working in a fixed frequency; wherein the transmitting link includes: a first directional coupler, wherein an input port of the first directional coupler is connected to the first signal source, and a pass-through port of the first directional coupler is connected to a first power amplifier, wherein the first power amplifier is configured to amplify the power of the signal output by the first directional coupler to reach an input power range of a first frequency doubler, and wherein the first frequency doubler is configured to double the frequency of the signal output by the first power amplifier to a second frequency range and output a resulting frequency-doubled signal to the transmitting antenna; wherein the receiving link includes: a second directional coupler, wherein an input port of the second directional coupler is connected to the second signal source; a first mixer, wherein a local oscillation port of the first mixer is connected to a pass-through port of the second directional coupler, and a radio-frequency port of the first mixer is connected to a coupling port of the first directional coupler to generate a difference frequency signal of the first signal source and the second signal source; a second power amplifier, wherein an input port of the second power amplifier is connected to an intermediate frequency port of the first mixer to receive the difference frequency signal, and the second power amplifier amplifies the power of the difference frequency signal to reach an input power range of a second frequency doubler; wherein an input port of the second frequency doubler is connected to an output port of the second power amplifier to double the frequency of the signal output by the second power amplifier to a first frequency; a second mixer, wherein a local oscillation port of the second mixer is connected to an output port of the second frequency doubler, and a radio-frequency port of the second mixer is configured to receive the echo signal received by the receiving antenna to generate a first down-converted signal; a third power amplifier, wherein input port of the third power amplifier is connected to a coupling port of the second directional coupler to amplify the power of the signal from the second directional coupler; a third frequency doubler, wherein an input port of the third frequency doubler is connected to an output port of the third power amplifier to double the frequency of the signal from the third power amplifier to a second frequency; a third mixer, wherein a local oscillation port of the third mixer is connected to an output port of the third frequency doubler, and a radio-frequency port of the third mixer is connected to an intermediate frequency port of the second mixer to generate a second down-converted signal, the method comprising:

moving, by the scanning device, the millimeter wave transceiving device, the transmitting antenna, and the receiving antenna to scan the object to be detected;

generating, by the millimeter wave transceiving device, a millimeter wave transmitting signal;

transmitting, by the transmitting antenna, the millimeter wave transmitting signal generated by the millimeter wave transceiving device to the object to be detected;

receiving, by the receiving antenna, an echo signal from the object to be detected and transmitting the echo signal to the millimeter wave transceiving device;

processing, by the millimeter wave transceiving device, the echo signal and sends it to the data gathering and processing device;

processing, by the data gathering and processing device, the signal from the millimeter wave transceiving device to generate a 3D image of the object to be detected; and displaying, by the image display device, the 3D image generated by the data gathering and processing device.

8. The method millimeter wave holographic 3D imaging detection of claim 7, wherein processing, by the data gathering and processing device, the signal from the millimeter wave transceiving device to generate a 3D image of the object to be detected comprises:

gathering the echo signal from the millimeter wave transceiving device, associating the echo signal to a spatial location signal, and performing Fourier transform and inverse Fourier transform to obtain the 3D image.

* * * * *